United States Patent
Talmor et al.

(10) Patent No.: US 12,513,180 B2
(45) Date of Patent: *Dec. 30, 2025

(54) METHODS FOR IMPROVING WEB SCANNER ACCURACY AND DEVICES THEREOF

(71) Applicant: F5, Inc., Seattle, WA (US)

(72) Inventors: Ron Talmor, Tel Aviv (IL); Ido Breger, Tel Aviv (IL); Barak Amar, Ramat Gan (IL); Guy Nir, Petah Tikva (IL)

(73) Assignee: F5, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,407

(22) Filed: Dec. 21, 2023

(65) Prior Publication Data
US 2024/0146759 A1    May 2, 2024

Related U.S. Application Data

(63) Continuation of application No. 15/013,167, filed on Feb. 2, 2016, now Pat. No. 11,895,138.

(60) Provisional application No. 62/110,649, filed on Feb. 2, 2015.

(51) Int. Cl.
*H04L 9/40* (2022.01)
(52) U.S. Cl.
CPC ............... *H04L 63/1433* (2013.01)
(58) Field of Classification Search
CPC .................................. H04L 63/1433
See application file for complete search history.

(56) References Cited

U.S. PATENT DOCUMENTS

| | | | |
|---|---|---|---|
| 8,370,938 B1* | 2/2013 | Daswani | H04L 63/14 726/23 |
| 8,555,391 B1* | 10/2013 | Demir | G06F 21/56 713/188 |
| 8,682,812 B1 | 3/2014 | Ranjan | |
| 8,850,584 B2* | 9/2014 | Alme | H04L 63/145 726/22 |

(Continued)

FOREIGN PATENT DOCUMENTS

| | | | | |
|---|---|---|---|---|
| CN | 103617390 A | * | 3/2014 | ........... G06F 21/563 |
| WO | WO-2007027469 A2 | * | 3/2007 | ........... G06F 16/951 |

OTHER PUBLICATIONS

Yu, Weider D., Dhanya Aravind, and Passarawarin Supthaweesuk. "Software vulnerability analysis for web services software systems." In 11th IEEE Symposium on Computers and Communications (ISCC'06), pp. 740-748. IEEE, 2006. (Year: 2006).*

(Continued)

*Primary Examiner* — Luu T Pham
*Assistant Examiner* — Walter J Malinowski
(74) *Attorney, Agent, or Firm* — Troutman Pepper Locke LLP

(57) ABSTRACT

A method, non-transitory computer readable medium, and device that assists with improving web scanner accuracy includes receiving a sitemap document associated with a webpage from an application security manager apparatus. The received sitemap document associated with the webpage is scanned. Next, one or more vulnerabilities are identified in the scanned sitemap associated with the webpage. A report including the identified one or more vulnerabilities is provided.

20 Claims, 6 Drawing Sheets

(56) References Cited

U.S. PATENT DOCUMENTS

| | | | |
|---|---|---|---|
| 8,893,294 B1 | 11/2014 | Steele, III | |
| 9,210,171 B1* | 12/2015 | Varadarajan | G06F 21/6218 |
| 9,294,442 B1 | 3/2016 | Lian | |
| 9,384,345 B2* | 7/2016 | Dixon | G06F 21/51 |
| 10,171,495 B1 | 1/2019 | Bowen | |
| 10,270,792 B1 | 4/2019 | Shemesh | |
| 11,138,463 B1 | 10/2021 | Wang | |
| 11,245,722 B1 | 2/2022 | Senecal | |
| 11,757,914 B1 | 9/2023 | Jakobsson | |
| 2002/0147805 A1* | 10/2002 | Leshem | G06F 11/32 |
| | | | 714/E11.181 |
| 2004/0088570 A1 | 5/2004 | Roberts | |
| 2004/0111669 A1* | 6/2004 | Rossmann | G06F 16/957 |
| | | | 707/E17.119 |
| 2005/0114658 A1 | 5/2005 | Dye | |
| 2007/0174915 A1 | 7/2007 | Gribble | |
| 2007/0204153 A1 | 8/2007 | Tome et al. | |
| 2009/0100518 A1* | 4/2009 | Overcash | G06F 21/552 |
| | | | 726/22 |
| 2009/0204638 A1* | 8/2009 | Hollier | G06F 16/951 |
| 2011/0119220 A1* | 5/2011 | Seolas | G06F 40/143 |
| | | | 706/47 |
| 2011/0214176 A1 | 9/2011 | Burch et al. | |
| 2011/0214182 A1 | 9/2011 | Adams | |
| 2012/0017274 A1* | 1/2012 | Schrecker | G06F 21/577 |
| | | | 726/22 |
| 2012/0036580 A1* | 2/2012 | Gorny | H04L 63/101 |
| | | | 726/25 |
| 2014/0283078 A1* | 9/2014 | Redfoot | H04L 63/0245 |
| | | | 726/23 |
| 2014/0298469 A1 | 10/2014 | Marion | |
| 2014/0317754 A1* | 10/2014 | Niemela | G06F 21/6227 |
| | | | 726/26 |
| 2015/0033331 A1 | 1/2015 | Stern | |
| 2015/0067848 A1 | 3/2015 | Baikalov | |
| 2015/0121529 A1 | 4/2015 | Quinlan | |
| 2016/0191554 A1 | 6/2016 | Kaminsky | |
| 2016/0275190 A1* | 9/2016 | Seed | H04L 67/02 |
| 2016/0306974 A1 | 10/2016 | Turgeman | |
| 2017/0126709 A1 | 5/2017 | Baradaran | |
| 2017/0223052 A1 | 8/2017 | Stutz | |
| 2017/0272404 A1 | 9/2017 | Prey et al. | |
| 2018/0020024 A1 | 1/2018 | Chao | |
| 2018/0167412 A1 | 6/2018 | Barrett | |
| 2018/0219910 A1 | 8/2018 | Greenshpan | |
| 2018/0241774 A1 | 8/2018 | Zhao | |
| 2019/0068640 A1 | 2/2019 | Araujo | |
| 2019/0087574 A1 | 3/2019 | Schmidtler | |
| 2019/0132291 A1 | 5/2019 | Zhao et al. | |
| 2019/0166141 A1 | 5/2019 | Xu et al. | |
| 2019/0318081 A1 | 10/2019 | Gupta | |
| 2019/0334940 A1 | 10/2019 | Bar Noy | |
| 2020/0099714 A1 | 3/2020 | Haridas | |
| 2020/0112578 A1 | 4/2020 | Gupta | |
| 2020/0153763 A1 | 5/2020 | Baudart | |
| 2020/0204589 A1 | 6/2020 | Strogov | |
| 2020/0301672 A1 | 9/2020 | Li | |
| 2020/0342103 A1 | 10/2020 | Luo | |
| 2020/0396233 A1 | 12/2020 | Luo | |
| 2021/0058395 A1 | 2/2021 | Jakobsson | |
| 2021/0232755 A1 | 7/2021 | Jadhav | |
| 2021/0334091 A1 | 10/2021 | Gujarathi | |
| 2022/0038481 A1 | 2/2022 | Jones | |
| 2022/0191241 A1 | 6/2022 | Vera-Schockner | |
| 2022/0279013 A1 | 9/2022 | Qiu | |
| 2024/0259347 A1 | 8/2024 | Grover | |
| 2025/0190966 A1 | 6/2025 | Gutierrez-Sheris | |

OTHER PUBLICATIONS

Saiedian, Hossein, and Dan Broyle. "Security vulnerabilities in the same-origin policy: Implications and alternatives." Computer 44, No. 9 (2011): 29-36. (Year: 2011).*

Phu H. Phung, David Sands, and Andrey Chudnov; Lightweight self-protecting JavaScript. In Proceedings of the 4th International Symposium on Information, Computer, and Communications Security (ASIACCS '09). Association for Computing Machinery, New York, NY, USA, 47-60 (ACM 2009) (Year: 2009).

R5 Networks Inc., "Big-IP Application Security Manager: Gelling Started®", Manual, Nov. 13, 2017, 46 pages, vol. 13.1, F5 Networks, Inc., Retrieved from the Inlernel:<hllps://lechdocs.f5.com/kb/en-US/producls/big-ip_asm/manuals/producl/asm-getting-started-13-1-0 .html>.

F5 Networks Inc., "Assigning Attack Signatures to Security Policies", Manual, 2019, 6 pages, F5 Networks, Inc., Retrieved from the Internet:<hllps://lechdocs.f5.com/kb/en-us/producls/big-ip_asm/manuals/producl/big-ip-asm-attack-and-bol-signatures-14-1-0/01.hlml#guid-9e8b2b2f-1325-4 715-a879-311 c802b2e97>.

F5 Networks Inc., "Big-IP 15.0.1 New and Installation" Release Notes, 2019, 33 pages, Version 15.0.1, F5 Networks, Inc., Retrieved from the Internet:<hllps://lechdocs.f5.com/kb/en-us/producls/big-ip_llm/releasenoles/product/relnole-bigip-15-0-1.hlml>.

F5—Enable Advanced Application Services Across Your Container Environment https://www.f5.com/products/big-ip-servic:es/container-ingress-servic:es downloaded Sep. 28, 2023.

F5—What Can Big-IP PEM Do for You? https://www.f5.com/products/big-ip-services/polic:y-enforcement-manager downloaded Sep. 28, 2023.

F5—More Than Load Balancing https:t/www.f5.com/products/big-ip-seivicestlocal-traffic-manager downloaded Sep. 28, 2023.

F5—Zero Trust Begins with Secure Access to All Apps https://www.f5.corniproducts/big-ip-se1vlces/access-pollcy-manager downloaded Sep. 28, 2023.

F5—Secure Your Network from Core to Edge https://www.f5.com/products/big-ip-se1vices/advanced-firewall-manager downloaded Sep. 28, 2023.

F5—Sophisticated Attacks Require Sophisticated Solutions https://www.f5.com/products/big-ip-seivices/ddos-hybrid-defender downloaded Sep. 28, 2023.

European Search Report for EP 24176730.0, dated 17 , Jul. 2024.

European Search Report Dated Jan. 15, 2025. EP Application No. EP 24 20 2454.

European search report Europe Application No. 24201979.2. Dated Jan. 14, 2025.

* cited by examiner

```
{
    "policyName": "example1"
    "updateType": "incremental",  // or "full"
    "updateLevel": 3,  // unsigned integer
    "protocolFree": false,  // true/false
    "urls": [
        {
            "url": "/index.php",
            "protocol": "http",
            "parameters": [
                {
                    "name": "param1"
                },
                {
                    "name": "param2"
                }
            ]
        },
        {
            "url": "/admin.php",
            "protocol": "https",
            "parameters": [

],
            "hostnames": [
                "hostname1",
                "hostname2"
            ]
        }
    ]
}
```

FIG. 5

```
{
  "errors":[
    {
      "message": "Can't handle data upload right now",
      "code":6
    }
  ]
}
```

FIG. 6

METHODS FOR IMPROVING WEB SCANNER ACCURACY AND DEVICES THEREOF

This application is a continuation of U.S. patent application Ser. No. 15/013,167, filed Feb. 2, 2026, and which claims the benefit of U.S. Provisional Patent Application Ser. No. 62/110,649, filed Feb. 2, 2015, which is hereby incorporated by reference in its entirety.

FIELD

This technology generally relates to methods and devices for network traffic management and, more particularly, to methods for improving web scanner accuracy and devices thereof.

BACKGROUND

Web scanners generally comprise a program which communicates with a web application through the web front-end, such as through web browsers, in order to identify potential security vulnerabilities in a web application and architectural weakness. These prior web scanners had no access to the source code and therefore detected vulnerabilities by actually performing the simulated attacks.

Unfortunately, prior web scanners are inefficient because they can not crawl through the entire web application because of the content, size and the format of the web pages. Additionally, prior web scanner can not keep track when the web application was updated because they can not access the source code. As a result, these prior web scanners are inefficient and will continue to scan previously scanned web pages even though there have been no updates to those web pages. Further, because of these limitations, these prior web scanners miss detecting vulnerabilities.

SUMMARY

A method for improving web scanner accuracy includes receiving by a web scanner apparatus a sitemap document associated with a webpage from an application security manager apparatus. The received sitemap document associated with the webpage is scanned by the web scanner apparatus. Next, one or more vulnerabilities are identified by the web scanner apparatus in the scanned sitemap associated with the webpage. A report including the identified one or more vulnerabilities is provided by the web scanner apparatus.

A non-transitory computer readable medium having stored thereon instructions for improving web scanner accuracy comprising machine executable code which when executed by at least one processor, causes the processor to perform steps includes receiving a sitemap document associated with a webpage from an application security manager apparatus. The received sitemap document associated with the webpage is scanned. Next, one or more vulnerabilities are identified in the scanned sitemap associated with the webpage. A report including the identified one or more vulnerabilities is provided.

A web scanner apparatus including at least one of configurable hardware logic configured to be capable of implementing or a processor coupled to a memory and configured to execute programmed instructions stored in the memory to receive a sitemap document associated with a webpage from an application security manager apparatus. The received sitemap document associated with the webpage is scanned. Next, one or more vulnerabilities are identified in the scanned sitemap associated with the webpage. A report including the identified one or more vulnerabilities is provided.

This technology provides a number of advantages including providing a method, non-transitory computer readable medium and apparatus that effectively assists with improving web scanner accuracy. By obtaining the data relating to the changes to the web application from the application security manager apparatus, the technology disclosed here is able to significantly improve the web scanning accuracy by scanning only the site map document received from the application security manager apparatus as opposed to the web application itself. Additionally using this technique, the technology is able to effectively identify the vulnerabilities to the web application.

BRIEF DESCRIPTION OF THE DRAWINGS

FIG. 5 is an exemplary illustration of a sitemap document; and

FIG. 6 is an exemplary illustration of a vulnerabilities document.

DETAILED DESCRIPTION

Figure 1:
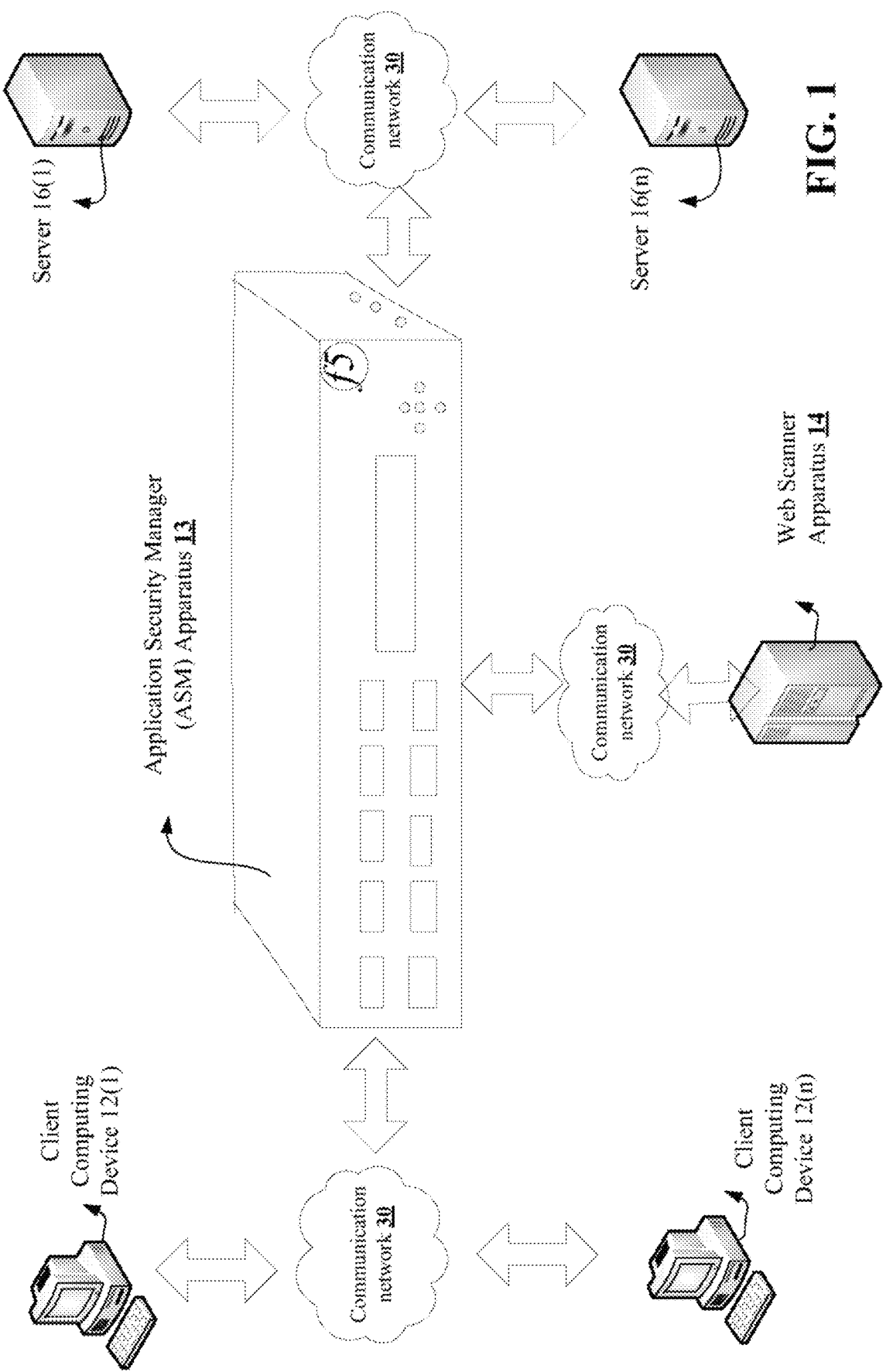
FIG. 1 is an example of a block diagram of an environment including a web scanner apparatus for improving web scanner accuracy.
Figure 2:
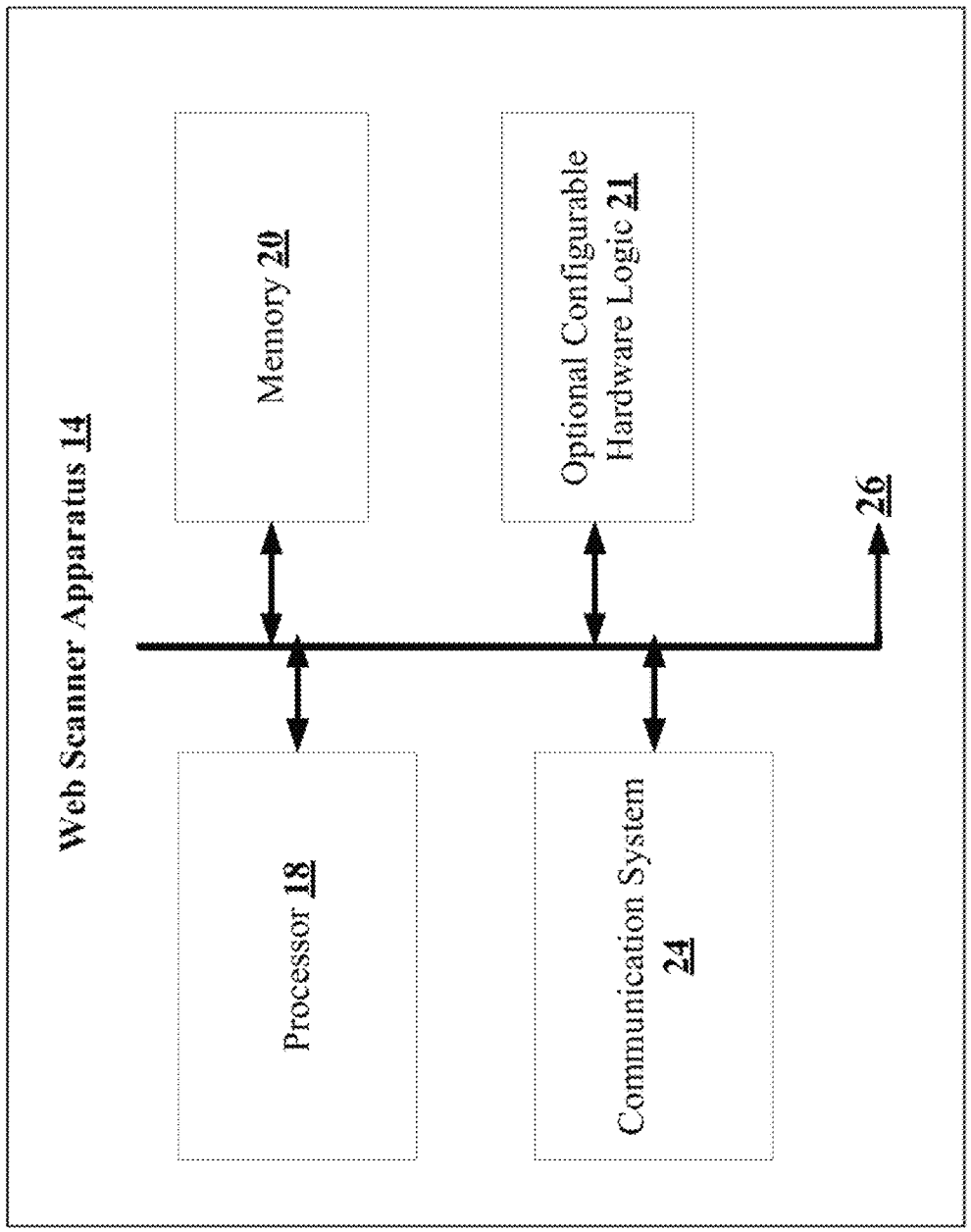
FIG. 2 is an example of a block diagram of a web scanner apparatus.

An example of a network environment 10 for improving web scanner accuracy with a web scanner apparatus 14 is illustrated in FIGS. 1 and 2. The exemplary environment 10 includes a plurality of client computing devices 12(1)-12(n), an application security manager apparatus 13, web scanner apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including improving web scanner accuracy.

Referring more specifically to FIGS. 1 and 2, the application security manager apparatus 13 is coupled to the plurality of client computing devices 12(1)-12(n) through the communication network 30, although the plurality of client computing devices 12(1)-12(n) and web scanner apparatus 14 may be coupled together via other topologies. Additionally, the application security manager apparatus 13 is coupled to the plurality of servers 16(1)-16(n) through the communication network 30, although the plurality of servers 16(1)-16(n) and web scanner apparatus 14 may be coupled together via other topologies. Further, the web scanner apparatus 14 is coupled to the application security manager apparatus 13 through the communication network 30, although the web scanner apparatus 14 and application security manager apparatus 13 may be coupled together via other topologies.

The web scanner apparatus 14 assists with improving web scanner accuracy as illustrated and described by way of the examples herein, although web scanner apparatus 14 may perform other types and/or numbers of functions. As illustrated in FIG. 2, the web scanner apparatus 14 may include a processor or central processing unit (CPU) 18, a memory 20, optional configurable hardware logic 21, and a communication system 24 which are coupled together by a bus 26, although the web scanner apparatus 14 may comprise other types and numbers of elements in other configurations. In this example, the bus 26 is a PCI Express bus in this example, although other bus types and links may be used.

The processor 18 within the web scanner apparatus 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
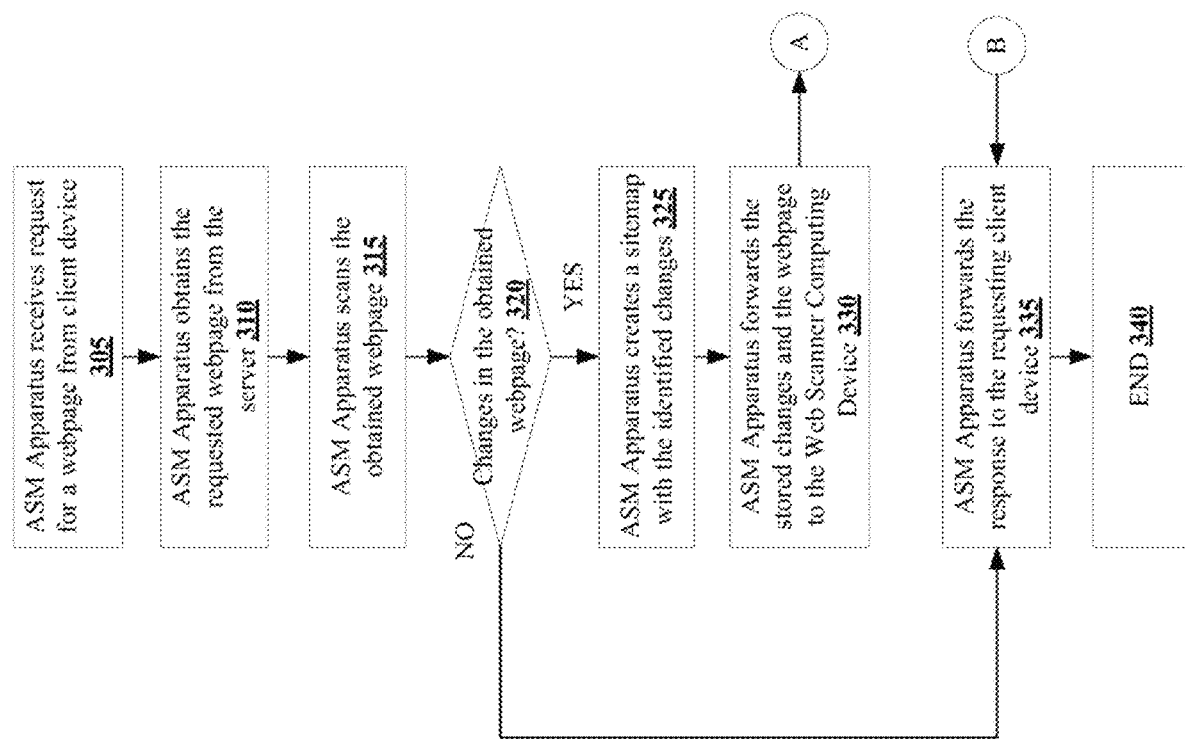
FIGS. 3-4 are exemplary flowcharts of a method for improving web scanner accuracy.
Figure 4:
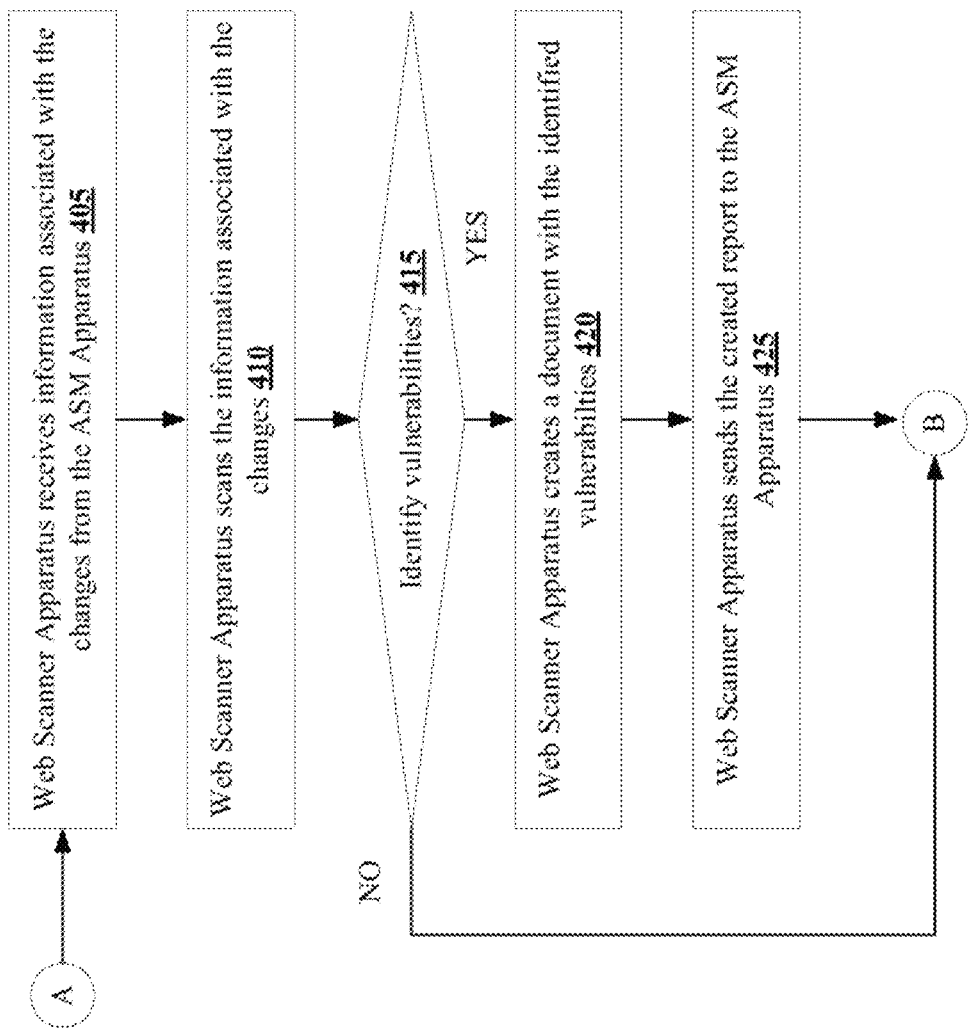

Memory 20 within the web scanner apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIGS. 3-4 are representative of example steps or actions of this technology that may be embodied or expressed as one or more non-transitory computer or machine readable instructions stored in memory 20 that may be executed by the processor 18 and/or may be implemented by configured logic in the optional configurable logic 21.

Accordingly, the memory of the application security manager apparatus 14 can store one or more applications that can include computer executable instructions that, when executed by the application security manager apparatus 14, cause the application security manager apparatus 14 to perform actions, such as to transmit, receive, or otherwise process messages, for example, and to perform other actions described and illustrated below with reference to FIGS. 3-5. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the mobile application manager apparatus itself, may be located in virtual server(s) running in a cloud-based computing environment rather than being tied to one or more specific physical network computing devices. Also, the application(s) may be running in one or more virtual machines (VMs) executing on the mobile application manager apparatus. Additionally, in at least one of the various embodiments, virtual machine(s) running on the mobile application manager apparatus may be managed or supervised by a hypervisor.

The optional configurable hardware logic 21 in the web scanner apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the web scanner apparatus 14 is used to operatively couple and communicate between the web scanner apparatus 14, the plurality of client computing devices 12(1)-12(n), the application security manager apparatus 13 and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIF S, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n), include a central processing unit (CPU) or processor, a memory, input/display device interface, configurable logic device and an input/output system or I/O system, which are coupled together by a bus or other link. The plurality of client computing devices 12(1)-12(n), in this example, may run interface mobile applications, such as Web browsers, that may provide an interface to make requests for and send and/or receive data to and/or from the plurality of servers 16(1)-16(n) via the web scanner apparatus 14 or the application security manager apparatus 13. Additionally, the plurality of client computing devices 12(1)-12(n) can include any type of computing device that can receive, render, and facilitate user interaction, such as client computers, network computer, mobile computers, virtual machines (including cloud-based computer), or the like. Each of the plurality of client computing devices 12(1)-12(n) utilizes the web scanner apparatus 14 to conduct one or more operations with the plurality of servers 16(1)-16(n), such as to obtain data from one of the plurality of servers 16(1)16(n), by way of example only, although other numbers and/or types of systems could be utilizing these resources and other types and numbers of functions utilizing other types of protocols could be performed.

The application security manager apparatus 13 includes a central processing unit (CPU) or processor, a memory, a configurable logic device, and an input/output system which are coupled together by a bus or other link, although other numbers and types of systems, devices, components, and elements in other configurations and locations can be used. The application security manager apparatus 13 assists the web scanner apparatus 14 with providing information regarding recently updated web pages via the communication network, although the application security manager commuting device 13 or other web application firewalls can perform assisting the web scanner apparatus 14 with providing information regarding recently updated webpages or other types of functions.

Each of the plurality of servers 16(1)-16(n) include a central processing unit (CPU) or processor, a memory, and a communication system, which are coupled together by a bus or other link, although other numbers and/or types of network devices could be used. Generally, the plurality of servers 16(1)16(n) process requests for providing access to one or more enterprise web applications received from the plurality of client computing devices 12(1)-12(n), the application security manager apparatus 13, or the web scanner apparatus 14 via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of client computing devices 12(1)-12(n), the application security manager apparatus 13, or the web scanner apparatus 14. The plurality of servers 16(1)-16(n) may provide data or receive data in response to requests directed toward the respective applications on the plurality of servers 16(1)-16(n) from the plurality of client computing devices 12(1)-12(n) or the web scanner apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single web application servers, one or more actions of each of the servers 16(1)-16(n) may be distributed across one or more distinct network computing devices. Moreover, the servers 16(1)-16(n) are not limited to a particular configuration. Thus, the plurality servers 16(1)-16(n) may contain a plurality of network computing devices that operate using a master/slave approach, whereby one of the network computing devices of the servers 16(1)-12(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, one or more of the servers 16(1)-16(n) depicted in FIG. 1 can operate within the application security manager apparatus 13 or the web scanner apparatus 14 rather than as a stand-alone server communicating with the application security manager apparatus 13 or the web scanner apparatus 14 via the communication network(s) 30. In this example the servers 16(1)-16(n) operate within the memory of the mobile application manager apparatus.

While the application security manager apparatus 13 and the web scanner apparatus 14 are illustrated in this example as including a single device, the application security manager apparatus 13 and the web scanner apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise the application security manager apparatus 13 and the web scanner apparatus 14 in other examples can be standalone devices or integrated with one or more other devices or applications, such as one of the plurality of servers 16(1)-16(n) or a network traffic management device or applications coupled to the communication network(s), for example. Moreover, one or more of the devices of the application security manager apparatus 13 and the web scanner apparatus 14 in these examples can be in a same or a different communication network 30 including one or more public, private, or cloud networks, for example.

Although an exemplary environment 10 with the plurality of client computing devices 12(1)-12(n), the web scanner apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network, such as the application security manager apparatus 13, plurality of client computing devices 12(1)-12(n), web scanner apparatus 14, or plurality of servers 16(1)-16(n), for example, may be configured to operate as virtual instances on the same physical machine. In other words, one or more of the application security manager apparatus 13, plurality of client computing devices 12(1)-12(n), web scanner apparatus 14, or plurality of servers 16(1)-16(n) illustrated in FIG. 1 may operate on the same physical device rather than as separate devices communicating through a network as depicted in FIG. 1. There may be more or fewer application security manager apparatus 13, plurality of client computing devices 12(1)-12(n), web scanner apparatus 14, or plurality of servers 16(1)-16(n) than depicted in FIG. 1. The plurality of client computing devices 12(1)-12(n) could be implemented as applications on the application security manager apparatus 13, or, web scanner apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for improving web scanner accuracy will now be described with reference to FIGS. 1-6. The exemplary method begins at step 305 where the application security manager apparatus 13 receives a request for a webpage from one of the plurality of client computing devices 12(1)-12(n), although the application security manager apparatus 13 can receive other types of request from other devices.

Next in step 310, the application security manager apparatus 13 obtains the requested webpage from one of the plurality of servers 16(1)-16(n), although the application security manager apparatus 13 can obtain the requested webpage from other locations. By way of example only, the obtained webpage may include textual data, images, audio files, video files or uniform resource location (URL) to other webpage, although the obtained webpage can include other types and/or amounts of information.

Next in step 315, the application security manager apparatus 13 scans the obtained webpage. In this example, the application manager computing device 13 scans the contents of the webpage including, textual data, images, audio, video and URL to other webpages, although the application security manager apparatus 13 can scan other types of and/or portions of the contents of the webpage.

Next in step 320, the application security manager apparatus 13 determines when there are changes to the obtained webpage. In this example, the application security manager apparatus 13 compares the information scanned in the step 315 with a previously scanned information associated with the same webpage that is stored in the memory of the application security manager apparatus 13 to identify the changes in the obtained webpage, although the application security manager apparatus 13 can determine the changes to the webpage using other techniques. Accordingly, when the application security manager apparatus 13 determines that there are no change(s) to the obtained webpage, then the No branch is taken to step 335 which will be further illustrated and described below. However, when the application security manager apparatus 13 determines that there are change(s) identified in the obtained webpage, then the Yes branch is taken to step 325.

In step 325, the application security manager apparatus 13 creates a sitemap document that includes the structure of the obtained webpage and the identified changes in the obtained webpage, although the application security manager apparatus 13 can create other types of documents including additional information associated with the obtained webpage. Alternatively, the application security manager apparatus 13 can create a sitemap document by scanning the received request to a webpage and performing a statistical analysis on the received request. By way of example only, the sitemap created by the application security manager apparatus 13 is in JavaScript Object Notion (JSON) format, although the application security manager apparatus 13 can create the sitemap document in other formats. By way of example, FIG. 5 illustrates an example of the sitemap document created in the application security manager apparatus 13 in JSON format. As illustrated in FIG. 5, the sitemap document created by the application security manager apparatus 13 includes parameters, Uniform Resource Locators (URLs) of the identified changes and the structure of the obtained webpage, although the sitemap document can include other types or amounts of information. Alternatively in another example, the application security manager apparatus 13 can include the structure of the obtained webpage, the identified changes in the obtained webpage and information associated with the previous version of the obtained webpage in the sitemap document.

Next in step 330, the application security manager apparatus 13 sends the created sitemap document to the web scanner apparatus 14, although the application security manager apparatus 14 can send other additional information along with the created sitemap document to the web scanner apparatus.

An example of a method for improving the accuracy of the web scanner using the sitemap document will now be illustrated with reference to FIG. 4. In step 405 of FIG. 4, the web scanner apparatus 14 receives sitemap document sent from the application security manager apparatus 13, although the web scanner apparatus 14 can receive other types and/or other amounts of other information associated with the webpage from the application security manager apparatus 13 and/or other sources. Alternatively in another example, the web scanner apparatus 14 can receive the sitemap document from the application security manager apparatus 13 at periodic intervals of time such as once in one hour, once in a day or once every week, although the web scanner apparatus 13 can receive the sitemap document at other periodic or non-periodic time intervals.

Next in step 410, the web scanner apparatus 14 scans the received sitemap document, although the web scanner apparatus 14 can perform other types of operation on the received sitemap. In this example, the web scanner apparatus 14 scans the information present in the parameters, URLs and other information present in the received sitemap document.

Next in step 415, based on the scan, the web scanner apparatus 14 determines when there are one or more vulnerabilities in the sitemap document (or the obtained webpage as the sitemap document includes the structure of the obtained webpage). By way of example only, the web scanner apparatus can scan the received sitemap document for special meta-characters that may cause SQL injection attack, although the web scanner apparatus 14 can scan the received sitemap document for other types of information to identify different types of vulnerabilities and can identify vulnerabilities in other manners. Additionally and by way of example, the web scanner apparatus 14 scans the information associated with the changes related to the obtained webpage to identify the one or more vulnerabilities. Further, the web scanner apparatus 14 also checks for any new urls in the sitemap document that may lead to different types of attacks as part of determining for the one or more vulnerabilities. Accordingly, when the web scanner apparatus 14 determines that there are no vulnerabilities detected in the sitemap document, then the No branch is taken back to step 335 of FIG. 3 that will be further illustrated below. However, when the web scanner apparatus 14 determines that there are one or more vulnerabilities in the received sitemap document, then the Yes branch is taken to step 420.

In step 420, the web scanner apparatus 14 creates a document report or a document including the determined one or more vulnerabilities, although the document can include other types and/or amounts of information and can provide other types of outputs. In this example, the document created by the web scanner apparatus 14 is in JSON format, although the document can be in other types of format. An example of the document created by the web scanner apparatus 14 is illustrated in FIG. 6, by way of example only.

Next in step 425, the web scanner apparatus 14 sends the created document back to the application security manager apparatus 13. Now the exemplary flow proceeds back to step 335 of FIG. 3 that will be illustrated below.

In step 335, the application security manager apparatus 13 receives the created report including the determined vulnerabilities from the web scanner apparatus 14. Next, the application security manager apparatus proceeds to make the necessary changes to the to the security policy based on the received report that the application security manager apparatus 13 would enforce on the requesting one of the plurality of client computing devices 12(1)-12(n). By way of example only, one of the example of the security policy can include, the application security manager apparatus 13 blocking access to files in the requested webpage when there are default installation files within the webpage that may pose vulnerability threats to the requesting one of the plurality of client computing devices. Next the application security manager apparatus 13 proceeds to send the webpage to the requesting one of the plurality of client computing devices 12(1)12(n). In another example, the application security manager apparatus 13 can take corrective actions to virtually patch the vulnerabilities based on security policies. By way of example only, the corrective actions taken by the application security manager apparatus 13 includes removing the content in the sitemap document that causes vulnerabilities, blocking the content in the sitemap document that causes vulnerabilities, or mask or change confidential information in the sitemap document that may be compromised due to the possible vulnerabilities, although the application security manager apparatus 13 can perform other types or amounts of corrective actions.

Alternatively, the application security manager apparatus 13 can simply forward the obtained webpage from the plurality of servers without making any changes to the obtained webpage when the No branch is taken from step 320. As previously illustrated above, the application security manager apparatus 13 can send the obtained webpage without modifying back to the requesting one of the plurality of client computing devices 12(1)-12(n) when there are no changes identified in the version of the obtained webpage when compared to the previous version of the webpages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for web scanning, the method implemented by a network traffic management system comprising one or more application security apparatuses, web scanner apparatuses, client devices, or server devices, and the method comprising:

comparing one or more portions of a requested webpage with stored information associated with a previous scan of the requested webpage to determine one or more changes in the requested webpage;

responsive to the determination of the one or more changes in the requested webpage, generating a sitemap document associated with the requested webpage, the sitemap document comprising an identification of the one or more changes in the requested webpage;

evaluating the sitemap document to determine one or more vulnerabilities associated with the one or more changes identified in the sitemap document and modify one or more security policies responsive to determined one or more vulnerabilities; and executing a corrective action, prior to sending the requested webpage to the client device, to patch the one or more vulnerabilities by removing content of the requested webpage that is associated with the one or more vulnerabilities based on the one or more modified security policies.

2. The method as set forth in claim 1, wherein the sitemap document further comprises one or more parameters and a plurality of URLs including one or more of the URLs associated with the one or more changes.

3. The method as set forth in claim 1, wherein the corrective action is further executed to modify the requested web page to change other content related to confidential information.

4. The method as set forth in claim 1, further comprising identifying at least one other vulnerability based on the evaluation of the sitemap document, wherein the at least one other vulnerability is associated with one or more special meta-characters in the sitemap document that are capable of causing a structured query language (SQL) injection attack.

5. The method as set forth in claim 1, further comprising generating and outputting a report comprising an indication of the one or more vulnerabilities.

6. A non-transitory computer readable medium having stored thereon instructions for web scanning comprising machine executable code which when executed by at least one processor, causes the processor to:

compare one or more portions of a requested webpage with stored information associated with a previous scan of the requested webpage to determine one or more changes in the requested webpage;

responsive to the determination of the one or more changes in the requested webpage, generate a sitemap document associated with the requested webpage, the sitemap document comprising an identification of the one or more changes in the requested webpage;

evaluate the sitemap document to determine one or more vulnerabilities associated with the one or more changes identified in the sitemap document and modify one or more security policies responsive to determined one or more vulnerabilities; and execute a corrective action, prior to sending the requested webpage to the client device, to patch the one or more vulnerabilities by removing content of the requested webpage that is associated with the one or more vulnerabilities based on the one or more modified security policies.

7. The medium as set forth in claim 6, wherein the sitemap document further comprises one or more parameters and a plurality of URLs including one or more of the URLs associated with the one or more changes.

8. The medium as set forth in claim 6, wherein the corrective action is further executed to modify the requested web page to change other content related to confidential information.

9. The medium as set forth in claim 6, wherein the machine executable code, when executed by the processor, further causes the processor to identify at least one other vulnerability based on the evaluation of the sitemap document, wherein the at least one other vulnerability is associated with one or more special meta-characters in the sitemap document that are capable of causing a structured query language (SQL) injection attack.

10. The medium as set forth in claim 6, wherein the machine executable code, when executed by the processor, further causes the processor to generate and output a report comprising an indication of the one or more vulnerabilities.

11. An application security apparatus, comprising memory comprising programmed instructions stored thereon and one or more processors configured to be capable of executing the stored programmed instructions to:
   compare one or more portions of a requested webpage with stored information associated with a previous scan of the requested webpage to determine one or more changes in the requested webpage;
   responsive to the determination of the one or more changes in the requested webpage, generate a sitemap document associated with the requested webpage, the sitemap document comprising an identification of the one or more changes in the requested webpage;
   evaluate the sitemap document to determine one or more vulnerabilities associated with the one or more changes identified in the sitemap document and modify one or more security policies responsive to determined one or more vulnerabilities; and
   execute a corrective action, prior to sending the requested webpage to the client device, to patch the one or more vulnerabilities by removing content of the requested webpage that is associated with the one or more vulnerabilities based on the one or more modified security policies.

12. The application security apparatus as set forth in claim 11, wherein the sitemap document further comprises one or more parameters and a plurality of URLs including one or more of the URLs associated with the one or more changes.

13. The application security apparatus as set forth in claim 11, wherein the corrective action is further executed to modify the requested web page to or change other content related to confidential information.

14. The application security apparatus as set forth in claim 11, wherein the processors are further configured to be capable of executing the stored programmed instructions to identify at least one other vulnerability based on the evaluation of the sitemap document, wherein the at least one other vulnerability is associated with one or more special meta-characters in the sitemap document that are capable of causing a structured query language (SQL) injection attack.

15. The application security apparatus as set forth in claim 13, wherein the processors are further configured to be capable of executing the stored programmed instructions to generate and output a report comprising an indication of the one or more vulnerabilities.

16. A network traffic management system, comprising one or more application security apparatuses, web scanner apparatuses, client devices, or server devices with memory comprising programmed instructions stored thereon and one or more processors configured to be capable of executing the stored programmed instructions to:
   compare one or more portions of a requested webpage with stored information associated with a previous scan of the requested webpage to determine one or more changes in the requested webpage;
   responsive to the determination of the one or more changes in the requested webpage, generate a sitemap document associated with the requested webpage, the sitemap document comprising an identification of the one or more changes in the requested webpage;
   evaluate the sitemap document to determine one or more vulnerabilities associated with the one or more changes identified in the sitemap document and modify one or more security policies responsive to determined one or more vulnerabilities; and
   execute a corrective action, prior to sending the requested webpage to the client device, to patch the one or more vulnerabilities by removing content of the requested webpage that is associated with the one or more vulnerabilities based on the one or more modified security policies.

17. The network traffic management system as set forth in claim 16, wherein the sitemap document further comprises one or more parameters and a plurality of URLs including one or more of the URLs associated with the one or more changes.

18. The network traffic management system as set forth in claim 16, wherein the corrective action is further executed to modify the requested web page to or change other content related to confidential information.

19. The network traffic management system as set forth in claim 16, wherein the processor are further configured to be capable of executing the stored programmed instructions to identify at least one other vulnerability based on the evaluation of the sitemap document, wherein the at least one other vulnerability is associated with one or more special meta-characters in the sitemap document that are capable of causing a structured query language (SQL) injection attack.

20. The network traffic management system as set forth in claim 16, wherein the processor are further configured to be capable of executing the stored programmed instructions to generate and output a report comprising an indication of the one or more vulnerabilities.

* * * * *